P. HOGG.
Hydrometer.
No. 35,152. Patented May 6, 1862.
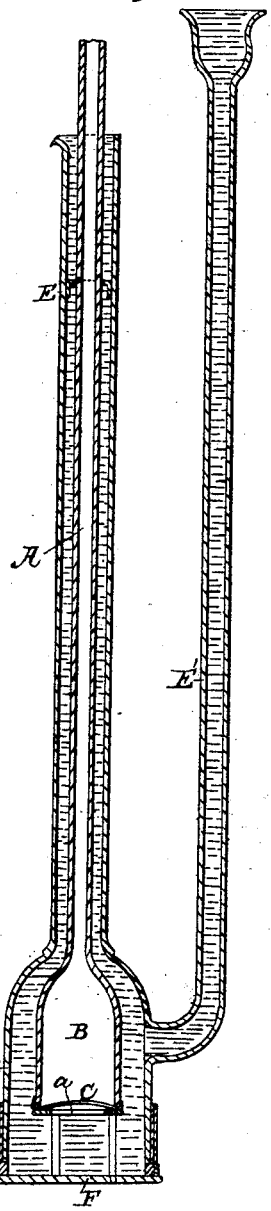
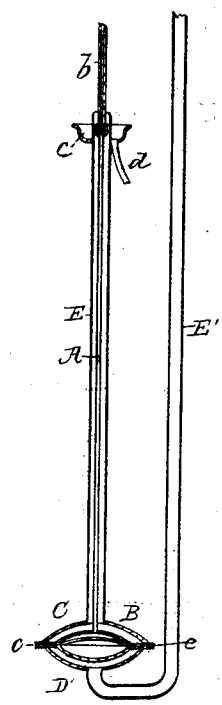
Witnesses.
James Laird
Edw. [illegible]
Inventor
Peter Hogg.

UNITED STATES PATENT OFFICE.

PETER HOGG, OF BROOKLYN, NEW YORK.

IMPROVEMENT IN HYDROMETERS.

Specification forming part of Letters Patent No. 35,152, dated May 6, 1862.

*To all whom it may concern:*

Be it known that I, PETER HOGG, of the city of Brooklyn, in the county of Kings and State of New York, have invented a new and Improved Hydrometer; and I do hereby declare that the following is a full, clear, and exact description of the same, reference being had to the accompanying drawings, forming part of this specification, in which—

Figure 1 is a central vertical sectional view of the hydrometer in a stationary form. Fig. 2 is a similar view of a modification of the same. Fig. 3 exhibits a central sectional view of the instrument in a portable form.

Similar letters of reference indicate corresponding parts in the several figures.

To ascertain the specific gravity of a liquid correctly by the ordinary hydrometer it is necessary to have the liquid exactly at a certain temperature, as the instrument can only indicate correctly at one temperature. When, therefore, it is desirable to test the density or strength of a hot or warm liquid or solution, as it is very frequently in the process of refining sugar and in other manufacturing processes, a portion of the liquid or solution has to be cooled, and so much difficulty is experienced in bringing it to the exact temperature to suit the hydrometer that an absolutely perfect test is seldom obtained.

My invention consists in a hydrometer by which the specific gravities of liquids can be ascertained at any temperature, such hydrometer being composed simply of a tube having its lower end closed by a flexible diaphragm. This tube, being filled with water to a certain point while placed in a vessel of water, and afterward plunged up to that point into the liquid to be tested, will quickly have the water contained within it brought to the same temperature as the surrounding liquid, and according as the specific gravity of such liquid which is in contact with one side of the flexible diaphragm is greater or less than that of the water in the tube which is on the other side of the said diaphragm the column of water in the tube will be thereby caused to rise or fall, and the tube, being properly graduated, will have the specific gravity of the liquid indicated within it by the height of the column of water.

The invention also consists in the arrangement of the so-constructed hydrometer within an inverted siphon through which the liquid to be tested may flow constantly, so that the specific gravity of the said liquid can be ascertained at any time without any manipulation whatever by merely looking at the tube.

To enable others to make and use my invention, I will proceed to describe its construction and operation.

Fig. 3 shows the instrument in its simplest form. A is a glass tube open throughout and having its lower end secured and cemented into a large flattened circular bulb, B C, composed of a metal box, B, one side of which is made open and covered with the flexible diaphragm C, which may be made of a piece of animal membrane, india-rubber, or other material impervious, or nearly so, to water, and tied over the edges of one side of the bulb, which is made open for its reception. This diaphragm should be loose enough to enable it to vibrate a considerable distance without stretching. D is a guard-plate covering and protecting the diaphragm, but perforated to allow the diaphragm to be exposed to any fluid in which the bulb may be placed. This guard-plate is hinged or otherwise attached in such manner as to be movable for the purpose of examining, repairing, or renewing the diaphragm. A standard or zero point is marked at any suitable height on the tube A, and the tube and bulb are charged by first placing them in water up to that point, and then pouring water into the tube till it is filled to that point, which establishes the proper position of the flexible diaphragm and places the instrument in condition for use. To test any liquid with this instrument, some of the said liquid is obtained in a bucket or other suitable vessel, and the instrument plunged into it as far as the standard-point above mentioned. As soon as the water in the bulb and tube has become of the same temperature as the surrounding liquid, the difference of their specific gravities is indicated by the position of the level of the water in the tube A, which may be graduated by any known or suitable system. If the liquid outside of the tube be of greater specific gravity than water, the pressure of the column of said liquids on the diaphragm is greater than would be that of a column of water in the tube, and forces the water up the tube till the pressure of the column in the tube is sufficient to balance the pressure of the liquid outside; but if the liquid outside of the tube is of less specific gravity precisely the reverse effect is produced, and the height of the column of water in the tube becomes less than that of the liquid outside. The correctness of this indication is not affected by the difference of volume of the water in the tube, due to different temperatures, as the diaphragm accommodates itself to any tendency to increased or diminished height of the column of water from expansion or contraction.

In the instrument shown in Fig. 1 the glass tube A is blown with a bulb, B, open at the bottom, over which is tied or otherwise secured the diaphragm C, and the tube is so supported in the glass inverted siphon-pipe E E' by an open ring, a, or other means, that liquid flowing through the said pipe may flow under the diaphragm and all around the bulb B and tube A. The tube and bulb are placed in the shorter leg, E, of the siphon-pipe, which is also made of bulbous form at the bottom for the reception of the bulb B, and which is fitted with a screw-cup or other movable bottom, F, to provide for the insertion and removal of the bulb B and tube A. In the upper part of the leg E there is fitted an open guide-ring to keep the tube upright; but this ring is constructed so as not to impede the flow of the liquid through the siphon, which is intended to be so arranged that a small stream of the liquid to be tested may be constantly supplied to the longer leg, E, of the siphon-pipe to keep a constant flow of liquid through the said pipe and over the top of the shorter leg thereof, where a uniform level is maintained around the tube A, whose zero or standard point is at this level. To obtain the proper quantity of water in the tube A and its bulb, the siphon-pipe must be first filled with water, and then the tube filled to a level with the overflow of the leg E of the siphon-pipe. On the water being let out of the siphon-pipe the instrument is ready for operation. The constant flow of the liquid through the siphon-pipe keeps the water in the bulb and tube at a temperature corresponding with its own, and the action of the water in the tube being the same as described with reference to Fig. 3 the density of the liquid that is at any time passing through the siphon-pipe can be always known by looking at the level of the water in A. The overflow from A may be collected in a suitable receptacle placed below.

In sugar-refineries, for testing what are known as the "sweet waters," and for testing weak solutions generally, the instrument may be constructed of great height—say twenty feet or more—in the manner illustrated in Fig. 3, and in this way the test may proceed with great delicacy, as a great change in the level of the water in the tube A will be produced with a very slight change in the density of the surrounding fluid. In this construction of the instrument the tube A and upper part of the bulb B are made of iron, with a short piece of glass tube, b, inserted at its upper end for indication. The inverted siphon-pipe is also made of iron, with a bulb to inclose B, said bulb to come apart at e for the insertion and removal of the tube A and its bulb. The latter bulb is attached to the outer bulb at e. Around the upper part of the shorter leg, E, of the inverted siphon-pipe there is shown a basin, c, for the overflow of the liquid, and an escape-pipe, d, to carry it away to a similar receptacle.

For some purposes it may be desirable to charge the tube A with some other liquid than water. For instance, if desirable to test the density of liquids at a temperature higher than the boiling-point of water, in which case oil may be used as a substitute.

What I claim as my invention, and desire to secure by Letters Patent, is—

1. A hydrometer composed of a tube for containing water or other liquid, fitted with a flexible diaphragm and operating substantially as herein specified.

2. The employment, in combination with the tube A and diaphragm B, of an inverted siphon-pipe, E E', the whole constituting a stationary apparatus for testing the density of liquids, and operating substantially as and for the purpose herein specified.

PETER HOGG.

Witnesses:
 JAMES LAIRD,
 EDW. W. HODGSON.